Feb. 1, 1944. D. O. BRANT 2,340,302
MILK STRAINER
Filed Oct. 7, 1941 3 Sheets-Sheet 2
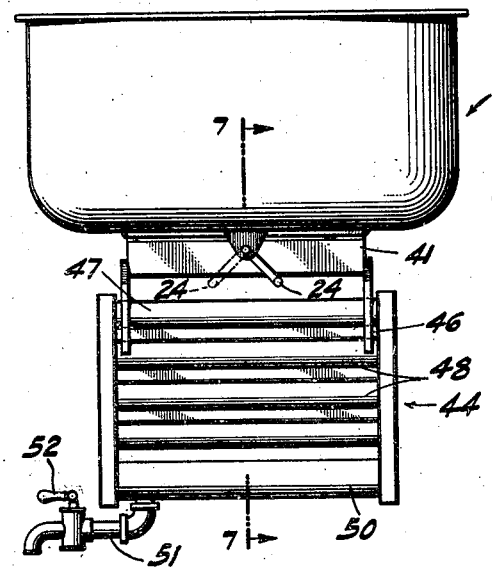
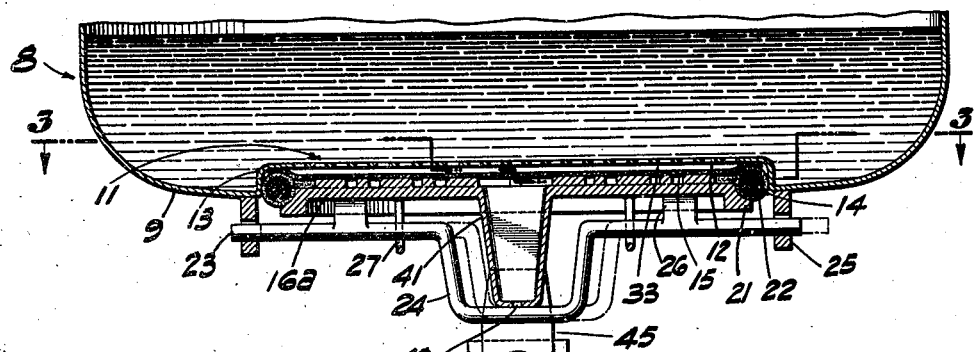
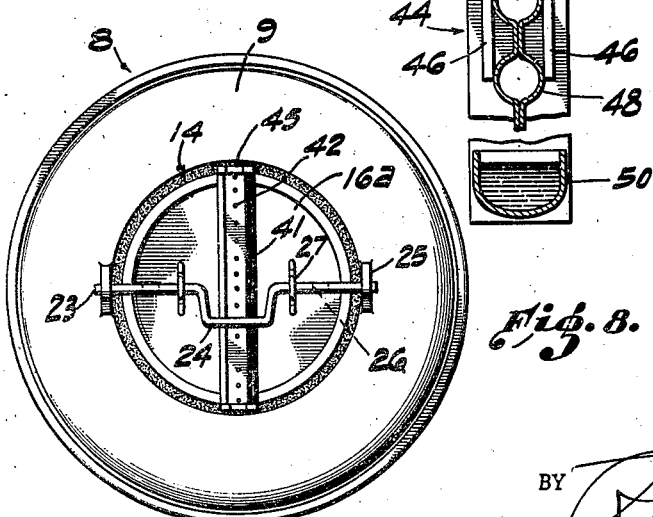
DAVID O. BRANT,
INVENTOR.
BY ATTORNEY.

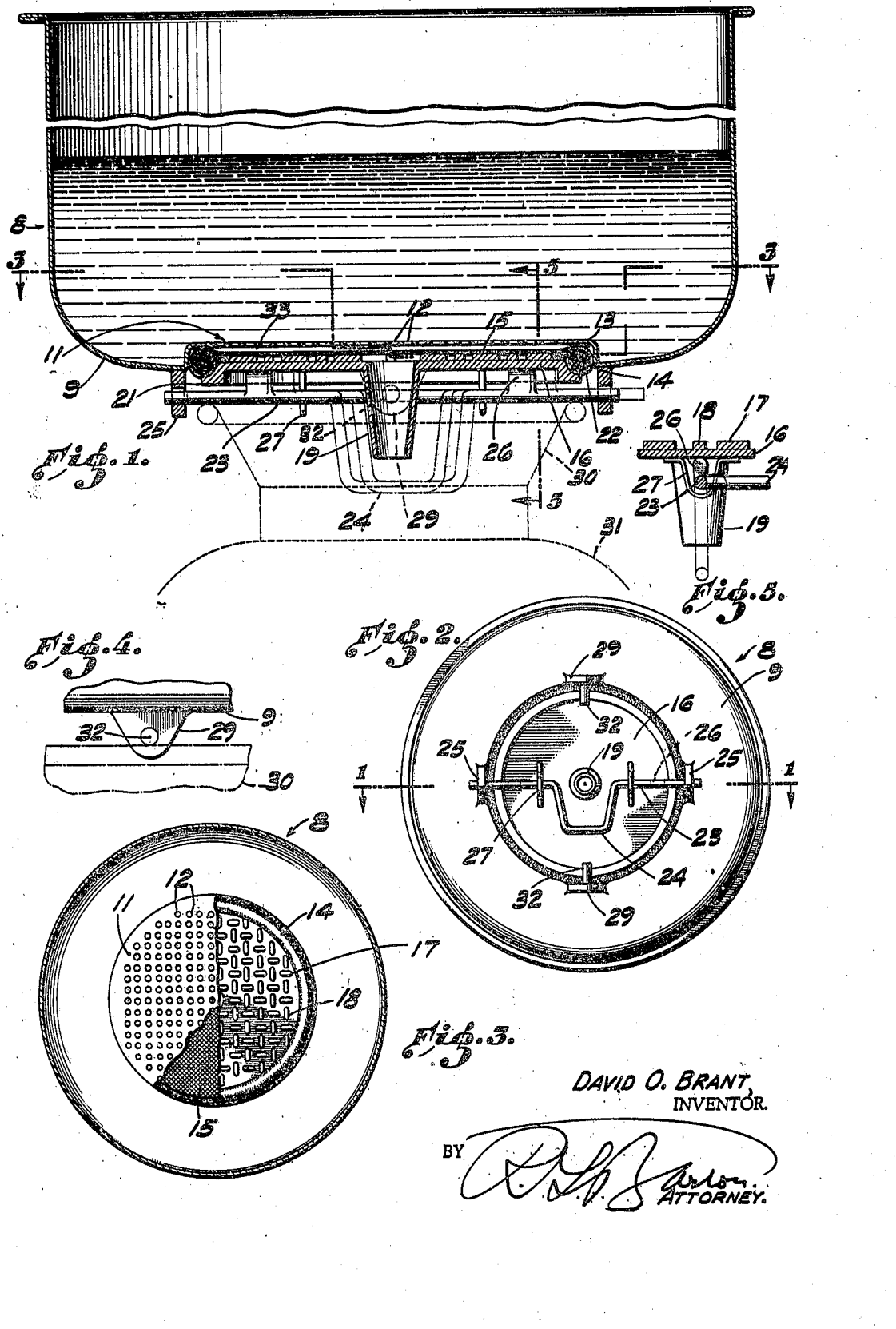

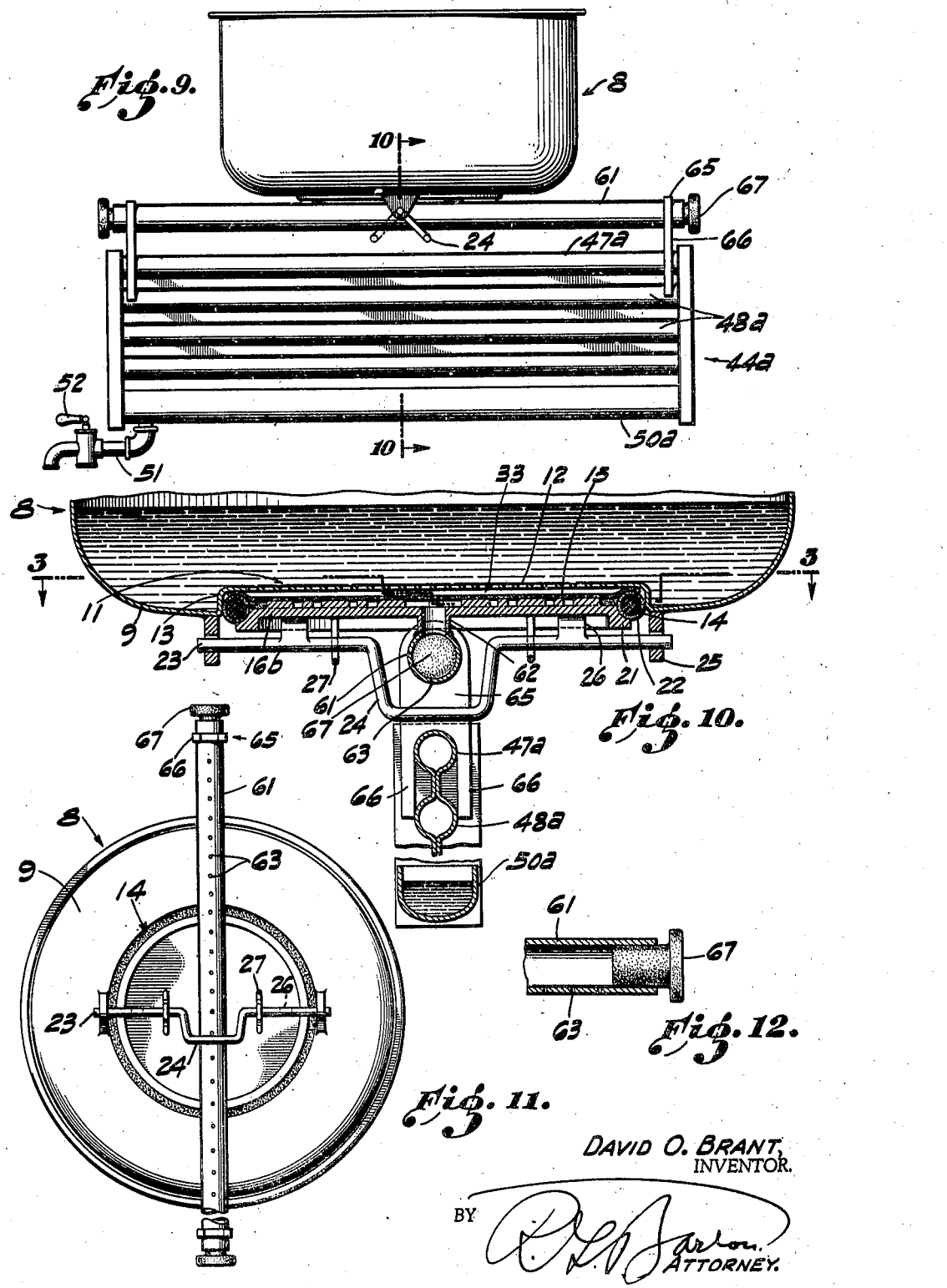

Patented Feb. 1, 1944

2,340,302

UNITED STATES PATENT OFFICE 2,340,302

MILK STRAINER

David O. Brant, Canoga Park, Calif.

Application October 7, 1941, Serial No. 414,011

25 Claims. (Cl. 210—159)

This invention relates to improvements in milk strainers.

In the art to which this invention pertains certain difficulties have hitherto been encountered and problems unsolved.

There has been a failure to provide in many milk straining devices for a convenient access to all parts of the structure for the purposes of cleansing and sterilizing them.

Another defect has been in regard to providing for a sufficiently free flow of milk through the straining element to minimize as much as possible danger of overflow from the top of the strainer tank, such overflow sometimes resulting from the means of constructing and supporting the strainer element, and sometimes being on account of the back pressure of air under the strainer within the can into which the strained milk is being delivered. In this connection another defect of certain prior devices of the class to which the invention pertains has been a failure to support strainer fabrics in such a manner that they do not sag down upon a more or less imperforate part of the strainer, thereby considerably obstructing the flow of milk through the fabric.

Also in certain states and cities laws pertaining to sanitation have been passed which prohibit the hand of the milkman being brought into contact with the interior of the strainer while in use, and for this reason the convenient operation of certain strainers now on the market has been rendered impossible.

With a view to overcoming the foregoing and other defects in the prior art, it is an important object of the present invention to provide a milk straining device wherein the straining element is removably attached to the tank in an external underlying manner so that it will be unnecessary for the user to insert his hands within the tank for the purpose of attaching the straining element or for removing it.

Another object of the invention is to provide a more convenient means for expeditiously assembling the parts of the strainer adjacent to the straining cloth preparatory to using the device, and for as ready disassembling said parts when it is desired to cleanse and sterilize them.

Still another object of the invention is to provide a superior means underlying a strainer cloth to support it in its operative position in such a manner that the milk will flow through it more rapidly, yet without impairing the efficient removal of impurities from the strained milk. Speaking more specifically of this feature of the invention, it is an object to provide a superior clamping disk which underlies the strainer cloth and is provided with an improved arrangement of lugs having milk outlet spaces between them and supporting said strainer cloth in such a manner as not to puncture it or cause it to become prematurely worn.

Also it is an object of the invention to provide for passing the milk through a cloth strainer element, particularly when made of cotton, in a manner aided by an underlying suction producing element, so that back air pressure and surface tension will be effectively overcome.

Yet another important object of the invention relates to the provision of an improved means for insuring a liquid-tight joint along the marginal portion of a sheet of cloth or other straining fabric.

Other objects, advantages and features of invention will hereinafter appear.

Referring to the accompanying drawings, which illustrate what is at present deemed to be preferred embodiments of the invention, Fig. 1 is a fragmentary vertical section of the device showing it in an operative position upon a milk can, the upper portion of which is outlined in broken lines, the sectioned portion of the view being on a smaller scale.

Fig. 2 is a bottom plan of the device.

Fig. 3 is a transverse section on angular line 3—3 of Figs. 1, 7 and 10, a part being broken away to show underlying structure.

Fig. 4 is a fragmentary elevational detail showing, on an enlarged scale, one of the ears which assist in supporting the device upon the rim of the can into which the milk is being strained.

Fig. 5 is a fragmentary transverse section taken on line 5—5 of Fig. 1. In this view the swingable part is shown in full lines in the operative position and in dotted lines in the inoperative position.

Fig. 6 is a side elevation of a modification shown supported by a heat exchanger.

Fig. 7 is a fragmental vertical section on line 7—7 of Fig. 6, this view being on a larger scale than the remaining views of sheet 2.

Fig. 8 is a bottom plan of the tank and attached strainer structure shown in Figs. 6 and 7, the heat exchanger being omitted.

Fig. 9 is a side elevation of a second modification.

Fig. 10 is a fragmental vertical section on line 10—10 of Fig. 9.

Fig. 11 is a bottom plan of the tank and attached strainer structure shown in Figs. 9 and 10.

Fig. 12 is a fragmentary sectional detail illustrating one of the closures of the milk delivery pipe of the strainer.

Referring in detail to the drawings, the principal parts of the device as shown are the strainer body or open-topped tank 8, which by preference and as shown is circular in plan. Said tank has a circumferentially contracted bottom portion 9 which is furnished centrally with a circular inside rise 11. Said tank is shown made of sheet material, said raised part 11 being foraminated thus providing a multiplicity of milk outlets 12. Said raised part 11 is preferably manufactured by being pressed up with a die, the die being so shaped as to form an upwardly curved margin 13 along the outer face of the rise, in order to conform approximately to the shape of the annular gasket 14, so that said gasket, together with the fabric disk 15 may be utilized to form a portion of the liquid-tight joint required.

A clamping disk 16 is provided for the purpose of clamping the rubber gasket 14 in its operative position shown in Fig. 1, said clamping disk also affording a means for collecting and delivering the strained milk. Viewed in its applied position said disk has its upper face furnished with a multiplicity of upstanding lugs or pegs. Said lugs are each shown having a flat top and being somewhat elongated, the arrangement of the lugs preferably being as shown in Fig. 3, where it will be seen that lugs 17 elongated from left to right are interspersed with lugs 18 which are elongated in a direction extending at a right angle to the lengths of the lugs 17. All these lugs 17 and 18 are shown arranged in rows and spaced apart from each other so that the milk may readily flow radially inward across the top of the disk to the spout 19 which projects downwardly from the center of the disk. The peripheral portion of the clamping disk 16 is provided with a downwardly and outwardly directed flange 21 which has a concave upwardly and outwardly directed face which forms a seat that conforms to the part of the gasket 14 with which this plate contacts. The gasket 14 is shown having a body of sponge rubber which is encircled by a latex covering 22, said covering making the device more sanitary by preventing the milk from entering the pores of the spongy rubber.

The means for clamping the disk 16 in place consists of a clamping rod 23, said rod being straight except that it has at its mid-length an out-bent portion 24 which projects a sufficient distance from the body portion of the rod to provide room for the spout 19 when said bent part 24 is manually grasped to rock the rod to and from the clamping position.

The bottom portion 9 of the tank is provided with a pair of diametrically opposite bearing ears 25 which are apertured to receive the end portions of the rod 23. Said rod is furnished at about the mid-length of each of its straight portions with a radial clamping lug 26, these lugs projecting from the rod oppositely to its outbent part 24, and being of the proper length to secure the proper clamping action against the disk 16. The strainer plate 16 is provided with a pair of outwardly projecting keeper loops 27 which prevent the rod 23 from at any time becoming completely separated from the clamping disk 16. However, the out-bent part 24 of the rod is of a sufficient internal width to permit the rod to be shifted lengthwise (as indicated by broken lines in the right hand portion of Fig. 1) to clear the rod from the left bearing ear 25, without this movement of the rod being obstructed by the spout 19.

In addition to the ears 25 the bottom of the tank 8 is provided with a pair of ears 29 spaced at a right angle to the ears 25, the four ears thus provided serving to keep the device in place upon the flared top 30 of the can 31, each of the ears 29 having an inward lateral extension 32 to rest upon the top of the can at such time. The ears 25 do not need to be provided with any such extensions, because the rod 23 which passes through them serve the same purpose of engaging the top of the can. The means which has just been described for supporting the strainer structure upon the can top 30 provides adequate air outlet spaces between the top of the can and the bottom of the strainer disk, hence in the operation of the device there is no danger of the flow of the milk being interfered with by the opposition of air pressure.

When the parts are in their operative positions the lugs 17 and 18 which upstand from the upper face of the plate 16 support the strainer cloth 15 in such a manner that there is maintained, not only an abundant amount of space beneath the strainer cloth 15 between the lugs, but also a narrow, laterally extensive space 33 between the cloth 15 supported by said lugs and the foraminated portion 12 of the tank bottom. By thus providing an ample inlet space above the straining fabric and an adequate milk outlet space beneath it in which to conduct the milk freely from all sides of the spout 19, a rapid as well as an efficient straining of the milk is insured.

The lugs 17 and 18 are deemed a preferred means for supporting the strainer cloth 15 in the advantageous manner which has just been described, and among other valuable features their flat upper faces safeguard the cloth against puncture or undue wear without materially encroaching upon the outflow space beneath said cloth. This result is assured because the lugs 17 and 18 are all sufficiently wide across their flat tops to insure that each lug will underlie (at least as to its length) a plurality of woof or else of warp threads. The lugs occupy a portion of the space beneath said cloth above the body portion of the disk 16 and thus reduce the volume of air that has to be driven out from under the strainer cloth by the milk before a priming effect is secured which maintains liquid contact of the milk throughout the under face of the strainer cloth, thereby removing back pressure and surface tension. The fabric strainer disk shown is desirably made of cotton and it is made of a proper size to be put into place easily within the circular recess in the tank bottom which is circumscribed by the arcuate margin 13.

From Fig. 1 it will be seen that only a narrow strip of the marginal portion of the fabric disk 15 is gripped between the imperforate peripheral portion of the foraminated wall 11 and the upper side of the rubber gasket 14; also that the inner face of the lower part of the arcuate riser part 13 is circumferentially contacted by the outer side of the gasket. These two circular lines of contact, in conjunction with the contact of the clamping plate 16 with the lower, inner part of said gasket, afford three lines or circular zones of contact between said gasket and the parts with which it cooperates. By this arrangement a superior liquid tight seal is furnished, and at the same time the amount of fabric required for making the fabric disk 15 is reduced to a minimum.

When the milk is poured into the tank 8 and strikes against the foraminated bottom wall 11 of the tank, said wall dissipates the force of the streams to such an extent that, when it reaches the fabric disk 15, it will not injure the latter.

In assembling the parts of the strainer for use, it being understood that all parts have been previously properly cleaned and sterilized, the tank is placed in an inverted position and the strainer cloth 15 is then smoothly spread over the foraminated bottom portion 11. Thereupon the rubber annulus is placed in the proper contacting relation with regard to the marginal portion of the fabric disk, preparatory to putting the clamping disk 16 in place. Said clamping disk is next applied with its concave marginal portion 21 in a proper contact with the rubber gasket as shown in Fig. 1. In order to bring said clamping disk into its applied position, it is necessary first to shift the clamping rod 23 longitudinally (as indicated by the dotted line part of the rod in the right hand portion of Fig. 1), whereupon the retracted end portion of the rod is projected under one of the bearing lugs 25 and the movement for doing this is continued sufficiently to permit the opposite end of the rod to be brought into register with the aperture of the diametrically opposite lug, into which aperture the rod may then be shifted to bring it to the full line position of Fig. 1, so far as its body portion is concerned. Thereupon the rod will be rocked so as to bring its bent part 24 from the dotted to the full line position of Fig. 1, which rocking movement will cause the lugs 26 to exert a clamping action upon the clamping plate 16 and urge said plate to its applied position in relation to the annular gasket 14. When this has taken place there will be a liquid tight joint along both the upper and the lower sides of the annular gasket 14.

The device is now ready for being disposed upon the top 30 of the milk can 31, as shown in Fig. 1, then when the milk is poured into the tank 8, it passes freely through the foraminated part 11 of the tank bottom and rapidly fills the space 33 underlying said foraminated part. Said inflow of the milk, however, cannot cause the strainer cloth 15 to sag into an inoperative position, because it is supported in an efficient manner by the flat faces of the lugs 17 and 18 and at the same time adequate outflow from the cloth is provided by the numerous spaces therebeneath between said lugs.

An additional advantage resulting from the use of the multiplicity of lugs 17 and 18 spaced apart from each other as shown, is that they prevent whirlpools of milk forming below the fabric, which would tend to reduce the maximum flow of milk and also to break the air seal and syphon effect of the spout, which would reduce the operative efficiency of the device.

By using the rubber annular gasket 14 in the manner stated, a perfect air sealing joint structure is provided without it being necessary to machine the parts to fit each other perfectly which would add to the expense of manufacture. The soft latex coating of the annulus assists in making a liquid tight joint. The latex coating around the annulus is protected from injury by the concave form of the seat provided therefor in the thickened rim portion 21 of the clamping plate and also by the similar seat for the upper outer portion of the annulus afforded by the part 13 of the tank bottom.

In assembling the parts in the manner just described it is unnecessary for the user of the device to bring his hands into contact with the interior of the tank 8. Also, this is the case when any adjustment of the parts becomes necessary after the device has been put into operation. For this reason the invention enables the user to comply in a more convenient manner with all state and city sanitary regulation concerning the handling of milk.

The fabric used for the strainer member 15, if cotton, should be of the absorbent kind in which the oil has been thoroughly removed, and if a moistening agent is used to break the surface tension of the milk on the cotton, the milk will then wet the cotton more rapidly and flow through it more promptly, quickly filling the space between the underlying fabric and putting the strainer into maximum service in a more expeditious and efficient manner. Said free passage of the milk through the strainer safeguards against foam accidently falling on the floor, or any portion of the milk body being splashed over the top of the tank.

Although the upstanding lugs 17 and 18 which support the strainer cloth 15 are at present deemed the most efficient spacing means which may be interposed between the body portion of the clamping disk 16 and the strainer cloth supported thereby, yet the claimed invention is not limited to the specific spacing means shown and described for this purpose.

In the modification shown in Figs. 6, 7 and 8, the spout 19 is replaced by a horizontal (operatively considered) milk delivery trough 41 the top of which extends diametrically across the modified strainer plate 16a and is shown as being integral therewith. The parts of the strainer structure above this modified strainer plate are the same as in the device already described and are therefore provided with the same reference numerals. The locking rod 24 and the parts associated operatively therewith are also the same as those already described but the outbent part 24 of the rod is arranged to swing through a somewhat different arc (though of the same length) the swing of this part of the bar being from the dotted line to the full line position thereof shown in Fig. 6.

Said trough 41 as seen in cross section is provided with a row of milk delivery apertures 42 along the midwidth of its bottom, the milk being delivered from these apertures along the midwidth of the upper surface of the upper tube 47 of the heat exchanger 44 upon which the device is removably supported. In order to insure a secure mounting for said device upon said heat exchanger, a saddle member 45 is secured by welding or otherwise to each end of said trough 41, said member 45 having properly spaced apart downwardly directed limbs 46 the upper parts of said limbs straddling the upper tube 47 of the heat exchanger and the lower end portions of said limbs preferably terminating, as shown, at opposite sides of the next lower tube 48 of the heat exchanger.

The heat exchanger 44 is of a conventional kind and is supported in any suitable manner (not shown). After the milk has externally flowed downwardly over the cooling tubes 48 it falls into the trough 50 whence it is conducted by means of an outlet pipe 51 controlled by a faucet 52.

Describing the second modification shown in Figs. 9 to 12, the trough 41 shown in Figs. 6, 7 and 8, is replaced by a milk delivery tube 61 which is united to the modified clamping disk 16b by means of an elongated neck 62 upstanding from about the middle third of the length of the pipe 61 and conducting the milk thereto. Said pipe 61 is furnished along its lower side with a row of milk outlets 63 positioned to deliver the milk to the upper side of the upper heat exchanger pipe 47a.

The heat exchanger structure is the same as that shown in Figs. 6 and 7 except that the length of the pipes 47a, 48a and of the trough 50a is greater in proportion to its remaining parts. The milk delivery pipe 61 has secured to it near each end a bifurcated saddle member 65 the limbs 66 of which pass astride the upper heat exchanger pipe 47a and extend down to opposite sides of the next pipe 48a of the heat exchanger 44a.

In Fig. 12 is shown in detail the removable closure means provided for the ends of the horizontal milk delivery tube 61 of the strainer. Said closure means consists of a rubber or rubber-like stopper 67 which fits friction tight within the tube. The removability of the stoppers 65 permits a stream of water to be passed through the tube 61 thereby efficiently cleansing it.

In the forms of the invention shown in Figs. 1 to 8 the tapered spouts 19 and 41 are of considerable length and are employed in an advantageous manner to efficiently accelerate the flow of the milk through the fabric strainer element by creating a vena contracta effect.

The length of the vena contracta spout plus the size of its outlet, determines the amount of suction or pull developed to keep the strainer in action until the fabric is plugged with strained out substances beyond the point where it will pass enough milk to keep the spout full, when the suction is broken and air is allowed to enter. Hence a single fabric strainer disk of a given straining area is made to strain a larger amount of milk in a given time than would otherwise be possible, unless a more positive suction means, for example a suction pump, were to be employed.

It should be understood that the present disclosure is for the purpose of illustration only and that this invention includes all modifications and equivalents which fall within the scope of the subject matter claimed.

What is claimed is:

1. In a device of the kind described, a tank having a circular bottom portion furnished with a circular inwardly directed central foraminated wall which forms an internal rise in relation to the tank, said rise being arcuate circumjacent to its juncture with the bottom of the tank, a toroidal rubber ring gasket round in cross section and of the proper diameter to match the concave side of the aforesaid arcuate part of said rise, a cloth disc having its peripheral portion interposed between said arcuate part and a portion of the toroid surface of said gasket, a clamping disc, a vena contracta outlet leading from the central portion of said clamping disk, and means to support said disk from the bottom of said tank and clamp it against the lower portion of said gasket to make a liquid tight joint along side portions of said gasket which abut said tank bottom and said disk.

2. The subject matter of claim 1 and, means to support said cloth disk in an upwardly spaced relation to the mouth of said vena contracta outlet.

3. In a device of the kind described, a tank having a recess underlying the central part of its bottom portion, the part of the tank bottom overlying said recess being foraminated to deliver milk therethough, a strainer fabric underlying said foraminated portion, a toroidal rubber ring gasket comprising a body of sponge rubber surrounded by a coating of latex underlying said tank bottom and circumscribing said foraminated part thereof, a clamping disk, means whereby the peripheral portion of said disk is pressed against said gasket to grip the peripheral portion of said fabric and at the same time form a fluid tight joint structure between said disk and said tank bottom contacted thereby, means whereby said strainer fabric is supported in a spaced relation both to the upper face of said disk and to the lower surface of said foraminated part of the tank bottom, a downwardly directed milk outlet spout carried by the central portion of said disk, and means interposed between the upper face of said disk and said fabric to maintain passages to the radial flow of milk across the upper face of said disk to its said outlet spout.

4. The subject matter of claim 3 and, the passage through said spout being downwardly tapered to produce a vena contracta effect on the milk passing therethrough.

5. In a device of the kind described, a tank having a foraminated bottom portion to afford a milk outlet, a strainer structure underlying said foraminated part and comprising a strainer fabric and a clamping disk to support said fabric, said disc having in its central portion a downwardly directed milk outlet spout to deliver the milk after being strained through said fabric, a pair of keeper loops extending downwardly from said clamping disk, said loops being on diametrically opposite sides of said spout, a clamping rod extending through said loops and by them prevented from being separated from said disk, said clamping rod having a pair of clamping lugs both of which project from the same side of the rod to exert a clamping action upon said disk, the central portion of said rod having an outbent part to provide a means for rocking the rod and at the same time maintain an unobstructed relation between the rod and said spout, and a pair of bearing ears depending from the tank bottom and positioned each to receive an end portion of the rod.

6. The subject matter of claim 5 and, the end portions of said rod being positioned to form a partial support for said tank upon the top of the milk can, and downward projections carried by the bottom of said tank to support the latter at points circumferentially intermediate to the end portions of said rod.

7. A milk strainer liquid tight joint structure comprising a rubber annulus consisting of a sponge rubber body surrounded by a coating of latex, each segmental part of said annulus being circular in cross section, a tank portion having a circumferential groove portion concaved to form a seating surface to fit upon one side of said gasket, and clamping means for said gasket including a member having a part concaved or grooved in such a manner as to fit the opposite side of said annulus.

8. In a device of the kind described, a tank having a foraminated bottom portion to afford a milk outlet, a strainer structure underlying said foraminated part and comprising a strainer fabric and a clamping disk to support said fabric, a horizontal milk outlet trough subjacent to said disk which extends diametrically thereof and is united thereto, said trough having a series of milk outlets in its bottom to deliver the milk after being strained through said fabric, a clamping rod extending diametrically across the lower face of said disk in a subjacent relation thereto, keeper means carried by said disk to prevent detachment of said rod therefrom, said rod having in its midlength portion an outbent part which passes downwardly around said trough in a spaced relation thereto to permit a rocking movement of the rod, a pair of bearing ears depending from the tank bottom and positioned to receive the end portions of said rod, said rod having a pair of clamping lugs both of which project from the same side thereof to exert a clamping action upon said disk when a rocking movement is imparted to the rod by means of its said outbent portion, and a saddle member secured to each end of said trough in a position to support the device upon the upper horizontal tube of a conventional heat exchanger.

9. The subject matter of claim 8 and, said saddle members each having an arcuate portion to seat upon the upper side of the upper tube of the heat exchanger and a downwardly extending limb at each side of said arcuate portion of sufficient length to overlie the adjacent side of the next lower tube of the heat exchanger.

10. In a device of the kind described, a tank having a foraminated bottom portion to afford a milk outlet, a strainer structure underlying said foraminated part and comprising a strainer fabric and a clamping disk to support said fabric, a horizontal tube underlying said disk in a subjacent relation thereto, a horizontally elongated neck uniting said tube to said disk and affording a milk passage leading from the space above said disk to the interior of said tube, said tube having a longitudinal row of milk outlets in its bottom to deliver the milk after being strained through said fabric, a clamping rod extending diametrically across the lower face of said disk in a subjacent relation thereto, keeper means carried by said disk to prevent detachment of said rod therefrom, said rod having in its midlength portion an outbent part which passes downwardly around said tube in a spaced relation thereto to permit a rocking movement of the rod, a pair of bearing ears depending from the tank bottom and positioned to receive the end portions of said rod, said rod having a pair of clamping lugs both of which project from the same side thereof to exert a clamping action upon said disk when a rocking movement is imparted to the rod by means of its said outbent portion, and a saddle member secured to each end of said tube in a position to support the device upon the upper horizontal tube of a conventional heat exchanger.

11. In a device of the kind described, a tank having a bottom furnished with a raised central portion which is foraminated, a strainer cloth underlying said raised portion in a parallel subjacent relation thereto, a disk underlying said cloth, means located between the peripheral portion of said disk and the outer portion of said strainer cloth to make a milk tight joint and hold said cloth in place at different points of contact, said disk carrying a multiplicity of upstanding elongated lugs having flat top faces upon which said cloth rests, said lugs being interspersed at right angles to each other leaving between them zig-zag passages for the flow of milk across the upper face of said disk toward delivery, said disk having a milk outlet passage leading downwardly through it, and means to detachably secure said disk in its operative position.

12. In a device of the kind described, a tank having a foraminated bottom portion to afford a milk outlet, a strainer structure underlying said foraminated part and comprising a strainer fabric and a clamping disk to support said fabric, said disk having in its central portion a downwardly directed milk outlet means having a milk delivery orifice in a downwardly spaced relation to the bottom face of said disk to deliver the milk after being strained through said fabric, a pair of keeper loops extending downwardly from said clamping disk, said loops being on diametrically opposite sides of said milk outlet means, a clamping rod extending through said loops and by them prevented from being separated from said disk, said clamping rod having a pair of clamping lugs both of which project from the same side of the rod to exert a clamping action upon said disk, the central portion of said rod having an outbent part to provide a means for rocking the rod and at the same time maintain an unobstructed relation between the rod and said milk outlet means, and a pair of bearing ears depending from the tank bottom and positioned each to receive an end portion of the rod.

13. In a device of the kind described, a tank having a circular raised bottom outlet wall portion surrounded by a riser wall, a fabric strainer disk underlying said bottom wall and positioned with its periphery extending circumjacent to said riser wall, a toroidal rubber ring gasket having an upper side portion which grips the marginal portion of said fabric disk against the peripheral portion of the lower side of said bottom wall, the outer portion of said gasket engaging along the inner side of said riser wall with a liquid tight fit, a clamping disk the peripheral part of which engages along the lower and inner portion of said gasket in a liquid tight manner, thereby effecting a third circular line or zone of liquid seal, said disk having in its central portion a downwardly directed vena contracta milk outlet spout to deliver the milk after being strained through said fabric, and means acting between said tank and clamping disk to maintain the latter in its operative position.

14. The subject matter of claim 5 and, said outbent part of said rod being of sufficient internal width to permit the rod to be shifted lengthwise to clear the rod from one of its bearing ears without such movement being obstructed by said spout.

15. The subject matter of claim 5 and, downward projections carried by the bottom of said tank to support the latter at points circumferentially intermediate to the end portions of said rod.

16. The subject matter of claim 10 and, said tube being open-ended, and stoppers for closing the ends of said tube.

17. The subject matter of claim 10 and, said tube being open-ended and stoppers for closing the ends of said tube, said stoppers being elastic and composed of rubber.

18. In a device of the kind described, a tank having a foraminated bottom portion to afford a milk outlet, a strainer structure underlying said foraminated part and comprising a strainer fabric and a clamping disk to support said fabric, a horizontal milk outlet trough subjacent to said disk which extends diametrically thereof and is united thereto, said trough having a series of milk outlets in its bottom to deliver the milk being strained through said fabric, a clamping rod extending diametrically across the lower face of said disk in a subjacent relation thereto, keeper means carried by said disk to prevent detachment of said rod therefrom, said rod having in its midlength portion an outbent part which passes downwardly around said trough in a spaced relation thereto to permit a rocking movement of the rod, a pair of bearing ears depending from the tank bottom and positioned to receive the end portions of said rod, said rod having a pair of clamping lugs both of which project from the same side thereof to exert a clamping action upon said disk when a rocking movement is imparted to the rod by means of its said outbent portion, and means secured to said trough in a position to support the device upon the upper horizontal tube of a conventional heat exchanger.

19. In a device of the kind described, a tank having a circularly raised, foraminated bottom outlet wall portion to afford a milk outlet surrounded by a riser wall, a strainer structure underlying said foraminated part and comprising a strainer fabric positioned with its periphery extending circumjacent to said riser wall, a toroidal rubber ring gasket having an upper arcuate side portion which grips the marginal portion of said fabric to said bottom wall, the outer arcuate portion of said gasket engaging along the inner side of said riser wall with a liquid tight fit, a clamping disk to support said fabric, said disk having an arcuate peripheral edge which engages along the lower and inner portion of said gasket in a liquid tight manner, said disk having in its central portion a downwardly directed vena contracta milk outlet means having a milk delivery orifice in a downwardly spaced relation to the bottom face of said disk to deliver the milk after being strained through said fabric, a pair of keeper loops extending downwardly from said clamping disk, said loops being on diametrically opposite sides of said milk outlet means, a clamping rod extending through said loops and by them prevented from being separated from said disk, said clamping rod having a pair of clamping lugs both of which project from the same side of the rod to exert a clamping action upon said disk, the central portion of said rod having an outbent part to provide a means for rocking the rod and at the same time maintain an unobstructed relation between the rod and said milk outlet means, and a pair of bearing ears depending from the tank bottom and positioned each to receive an end portion of the rod.

20. In a milk strainer, a tank bottom provided with a downwardly directed vena contacta milk outlet spout, a strainer fabric, and means to support said fabric in an upwardly spaced relation to the mouth of said vena contracta spout, said means including a toroidal rubber ring gasket, said gasket having two circumferentially extending arcuate side portions, one of said side portions gripping the marginal portion of said fabric against said bottom wall and the other arcuate side portion engaging said tank bottom with a liquid tight fit independent of the area gripping said fabric.

21. In a milk strainer, a tank bottom provided with a downwardly directed vena contracta milk outlet spout, a strainer fabric, and means to support said fabric in an upwardly spaced relation to the intake end of said vena contracta spout, said means including a multiplicity of lugs arranged in upstanding rows in the bottom of the tank subjacent said fabric and spaced apart from each other whereby the milk may readily flow underneath said fabric after being strained into the mouth of said vena contracta spout.

22. The combination with the foraminated bottom wall of a milk strainer, of a toroidal rubber ring gasket consisting of a sponge rubber body surrounded by a coating of latex, a strainer fabric, and means cooperating with said gasket to clamp one circumferentially extending arcuate portion thereof against the marginal portion of said fabric and in turn said fabric against the tank bottom and another circumferentially extending arcuate portion of said gasket being gripped in a leak proof manner against said bottom wall adjacent the fabric gripped area.

23. In a milk strainer, a tank having a bottom outlet wall, a strainer fabric juxtaposed against said bottom wall, and a gasket one portion of which grips the marginal portion of said fabric against said bottom wall and another portion which engages said bottom wall with a liquid tight fit, said fabric gripped portion and wall sealed portions being along independent zones of contact of said gasket with each of said elements abutted, said bottom wall having in its central portion a downwardly directed vena contracta milk outlet spout to deliver the milk after being strained through said fabric.

24. The subject matter of claim 23 and, detachable means operatively related to said gasket to clamp and maintain it clamped in the aforesaid operative relations with said fabric and bottom wall.

25. The subject matter of claim 24 and, said gasket comprising a toroidal rubber ring, said independent zones of contact consisting of different circumferentially extending arcuate portions of said ring.

DAVID O. BRANT.